(12) United States Patent
Schindler

(10) Patent No.: US 10,024,348 B2
(45) Date of Patent: Jul. 17, 2018

(54) CORNER CONNECTOR FOR CONNECTING AT LEAST TWO FRAME PROFILES OF A FRAME WHICH ARE ARRANGED PERPENDICULARLY RELATIVE EACH OTHER

(71) Applicant: RITTAL GMBH & CO. KG, Herborn (DE)

(72) Inventor: Timo Schindler, Bischoffen (DE)

(73) Assignee: RITTAL GMBH & CO. KG, Herborn (DE)

( * ) Notice: Subject to any disclaimer, the term of this patent is extended or adjusted under 35 U.S.C. 154(b) by 0 days.

(21) Appl. No.: 15/120,869

(22) PCT Filed: Feb. 10, 2015

(86) PCT No.: PCT/DE2015/100052
§ 371 (c)(1),
(2) Date: Aug. 23, 2016

(87) PCT Pub. No.: WO2015/127925
PCT Pub. Date: Sep. 3, 2015

(65) Prior Publication Data
US 2016/0363150 A1 Dec. 15, 2016

(30) Foreign Application Priority Data
Feb. 25, 2014 (DE) .................. 10 2014 102 464

(51) Int. Cl.
*F16B 12/50* (2006.01)
*H02B 1/01* (2006.01)
*F16B 12/44* (2006.01)

(52) U.S. Cl.
CPC ............. *F16B 12/50* (2013.01); *H02B 1/014* (2013.01); *F16B 2012/446* (2013.01)

(58) Field of Classification Search
CPC ..... F16B 12/50; F16B 2012/446; H02B 1/014
See application file for complete search history.

(56) References Cited

U.S. PATENT DOCUMENTS 424,554 A * 4/1890 Hofman .................. A47F 5/005
312/140
2,485,172 A * 10/1949 Rau ......................... F16B 12/50
248/188
(Continued)

FOREIGN PATENT DOCUMENTS

DE    2912945 A1    10/1980
DE    9304630 U1 * 6/1993 ............. A47B 47/02
(Continued)

OTHER PUBLICATIONS

International Search Report (in English and German) and Written Opinion (in German) for PCT/DE2015/100052, dated Jun. 2, 2015; ISA/EP.
(Continued)

*Primary Examiner* — Stanton L Krycinski
(74) *Attorney, Agent, or Firm* — Harness, Dickey & Pierce, P.L.C.

(57) ABSTRACT

A corner connector for connecting at least two frame profiles of a frame rack arranged perpendicular to each other, which frame rack consists of a plurality of pieces, at least one of which is designed to bear against one or more of the frame profiles, characterized in that the piece which is designed to bear against one or more of the frame profiles is a first molded sheet metal part with a receiving opening in which or on which a threaded sleeve is situated.

8 Claims, 5 Drawing Sheets

(56) References Cited

U.S. PATENT DOCUMENTS

Figure 1:
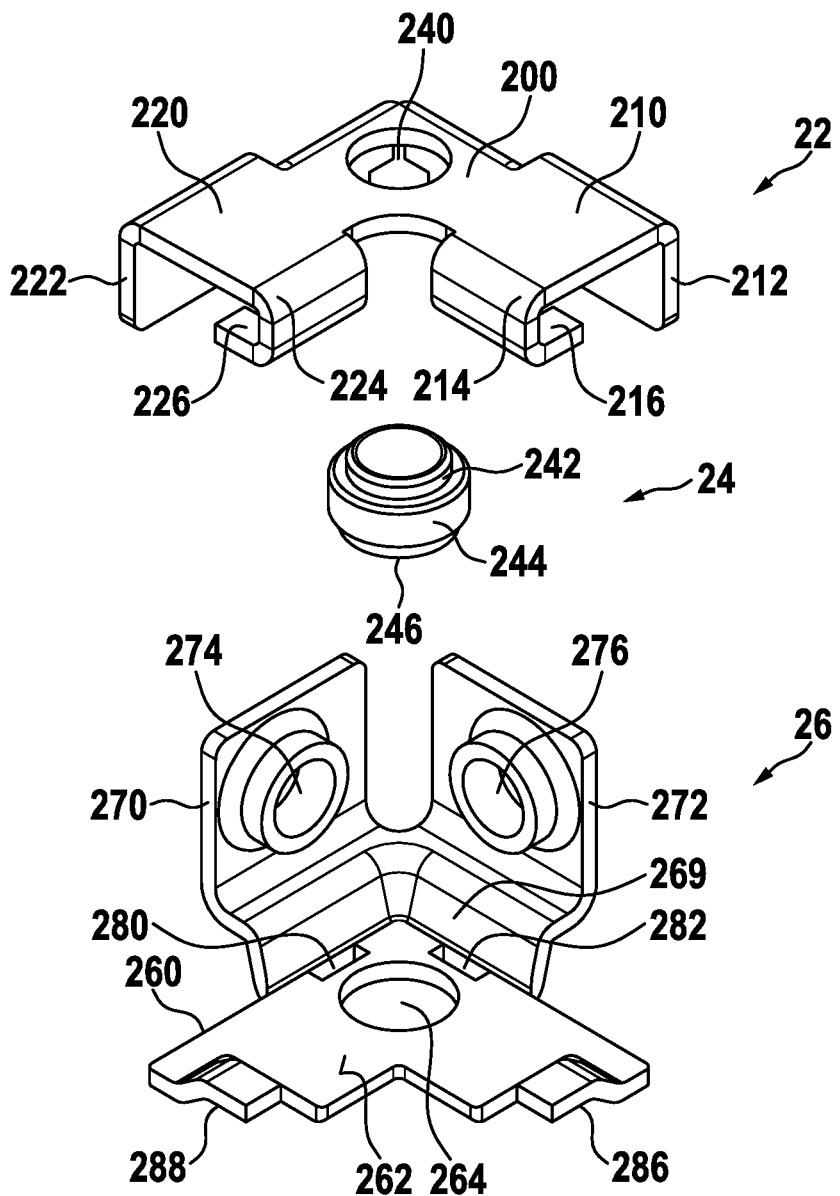

| | | | | |
|---|---|---|---|---|
| 3,182,846 | A * | 5/1965 | La Kaff | A47B 47/03 108/156 |
| 3,353,854 | A * | 11/1967 | Hansen | E04B 1/5818 403/171 |
| 3,542,407 | A * | 11/1970 | Brown | A47B 47/0008 403/172 |
| 3,765,541 | A * | 10/1973 | Madey | A47B 47/00 211/182 |
| 3,977,800 | A * | 8/1976 | Cassel | F16B 7/0446 403/172 |
| 3,981,251 | A * | 9/1976 | Damberg | A47B 57/18 108/154 |
| 4,078,847 | A * | 3/1978 | Presnick | H02B 1/01 312/111 |
| 4,610,561 | A * | 9/1986 | Cecchellero | E04B 1/1912 403/171 |
| 6,270,283 | B1 * | 8/2001 | Turati | H02B 1/01 403/174 |
| 6,379,074 | B1 * | 4/2002 | Chin | F16B 7/0486 403/171 |
| 6,471,434 | B2 * | 10/2002 | Chin | A47B 13/06 312/140 |
| 6,902,068 | B1 * | 6/2005 | Fontana | H02B 1/01 211/189 |
| 7,364,243 | B2 * | 4/2008 | Wyatt | H02B 1/30 211/182 |
| 8,196,758 | B2 * | 6/2012 | Lee | A47B 47/03 211/26 |
| 9,371,849 | B2 * | 6/2016 | Schaaf | F16B 7/0446 |
| 2003/0214205 | A1 * | 11/2003 | Wyatt | H02B 1/30 312/265.4 |
| 2009/0001863 | A1 | 1/2009 | Wyatt et al. | |
| 2014/0286695 | A1 * | 9/2014 | Jocham | H02B 1/30 403/205 |
| 2017/0367501 | A1 * | 12/2017 | Goppion | A47F 3/005 |

FOREIGN PATENT DOCUMENTS

| | | | | |
|---|---|---|---|---|
| DE | 19536950 C1 | 11/1996 | | |
| DE | 29712998 U1 | 9/1997 | | |
| DE | 10328408 A1 | 1/2005 | | |
| FR | 2677084 A1 * | 12/1992 | | A47B 47/0008 |
| WO | WO-2012016297 A1 * | 2/2012 | | E04B 1/5831 |
| WO | WO-2012039689 A2 | 3/2012 | | |

OTHER PUBLICATIONS

International Preliminary Report on Patentability (Chapter II) (in German) for PCT/DE2015/100052, dated Feb. 5, 2016; IPEA/EP.

* cited by examiner

CORNER CONNECTOR FOR CONNECTING AT LEAST TWO FRAME PROFILES OF A FRAME WHICH ARE ARRANGED PERPENDICULARLY RELATIVE EACH OTHER

CROSS-REFERENCE TO RELATED APPLICATIONS

This application is a 371 U.S. National Stage of International Application No. PCT/DE2015/100052, filed on Feb. 10, 2015, which claims priority to German Application No. 10 2014 102 464.8, filed on Feb. 25, 2014. The entire disclosures of the above applications are incorporated herein by reference.

FIELD

The disclosure concerns a corner connector for connecting at least two frame profiles of a frame rack arranged perpendicular to each other, which frame rack consists of a plurality of pieces, at least one of which is designed to bear against one or more of the frame profiles.

BACKGROUND

This section provides background information related to the present disclosure which is not necessarily prior art.

Such a corner connector is known from DE 103 28 408 A1. There, three frame rods standing perpendicular to each other are supposed to be joined to construct a switch cabinet, especially a low-voltage switch cabinet. A corner connector used for this has a two-piece design, both pieces having three arms standing perpendicular to each other, between which the frame rods can be secured. In a corner region between the legs there is a through hole, through which a screw can be inserted and then screwed into a threaded bore on the other piece when the frame rods are being tightened up. This corner connector has the problem that the frame rods have to be manually placed in a defined position before they can be tightened up.

SUMMARY

This section provides a general summary of the disclosure, and is not a comprehensive disclosure of its full scope or all of its features.

Therefore, the problem which the disclosure proposes to solve is the providing of a corner connector in which the precise orienting of the frame profiles is possible without major effort. Moreover, the corner connector should be possible to fabricate by simple forming processes.

For this, in the corner connector of the kind mentioned above, according to the disclosure the piece which is designed to bear against one or more of the frame profiles is a first molded sheet metal part with a receiving opening, in which or on which a threaded sleeve is situated. The molded sheet metal part is produced in a single or multiple bending and punching process in order to achieve the required shape, which makes possible a favorable production in contrast with cast pieces. The threaded sleeve serves to receive a crane lug or a base fastening, for example, and is therefore oriented with a vertical frame profile in the installed condition of the corner connector.

It is advantageously provided that the threaded sleeve is press-fitted in the receiving opening or welded in or on the receiving opening.

According to a first aspect, the first molded sheet metal part has at least two legs emerging from a central piece and perpendicular to each other for engaging with respective frame profiles and for bearing against at least one inner wall of a respective frame profile, the receiving opening being drawn into the central piece. The legs can have different embodiments and their configuration depends on the frame profiles which they are supposed to connect.

Moreover, a second molded sheet metal part can be present, having a reference surface for the central piece of the first molded sheet metal part, relative to which the central piece is oriented in parallel.

The reference surface can have a receiving opening which corresponds in its dimensions to the receiving opening of the first molded sheet metal part, so that the threaded sleeve is arranged between the two receiving openings and can also be press-fitted in the receiving opening of the second sheet metal part or welded in it or on it. Thus, for this variant, a corner connector is created which can be used already in this simple configuration for the connecting of, for example, two horizontal profiles of a frame rack.

Further advantageously, at least one leg emerges from the reference surface for engaging with a third frame profile, which is generally a vertical frame profile. Vertical frame profiles are often hollow chamber profiles with two hollow chambers, such as are described for example in DE 195 36 950 C1, where the outer profile sides standing perpendicular to each other are formed by corresponding profile segments of each hollow chamber. Preferably, therefore two such legs are provided in the corner connector, being arranged perpendicular to each other, so that a secure positioning of such a vertical frame profile becomes possible.

This at least one leg can also have a passage, especially a threaded passage. If the threaded passage is accessible from the outside when the vertical frame profile is put in place, it can receive threaded bolts, screws, or the like, such as are required for placing in a row with another frame rack, for attachment of flat pieces, and so on.

For the stability of a corner connector of this variant, the legs of the first molded sheet metal part can advantageously be bent, which improves their torsional strength.

According to one preferred embodiment, the legs or the bent regions of the legs moreover have bent lugs, and the reference surface is formed on a central plate, which is contoured so that it lies on the lugs of the first molded sheet metal part. This ensures an exact positioning of the first molded sheet metal part in relation to the second molded sheet metal part.

The central plate of the second molded sheet metal part can furthermore have an opening, which remains accessible when the frame profiles are mounted on the corner connector.

The corner connectors according to the disclosure are fashioned as interior corner connectors, which are essentially enclosed by the frame profiles when mounted.

DRAWINGS

The drawings described herein are for illustrative purposes only of selected embodiments and not all possible implementations, and are not intended to limit the scope of the present disclosure.

Figure 2:
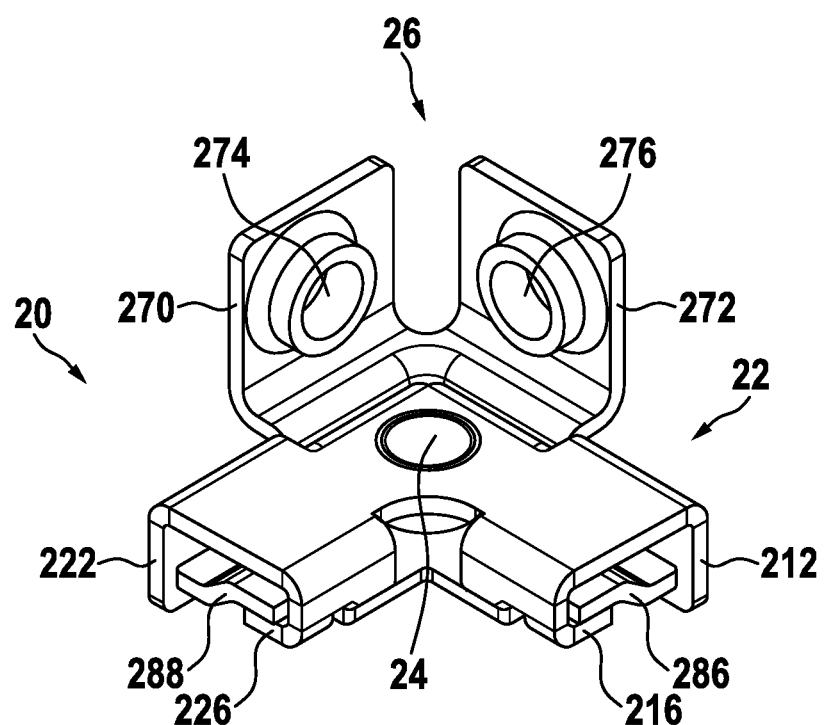
Figure 3:
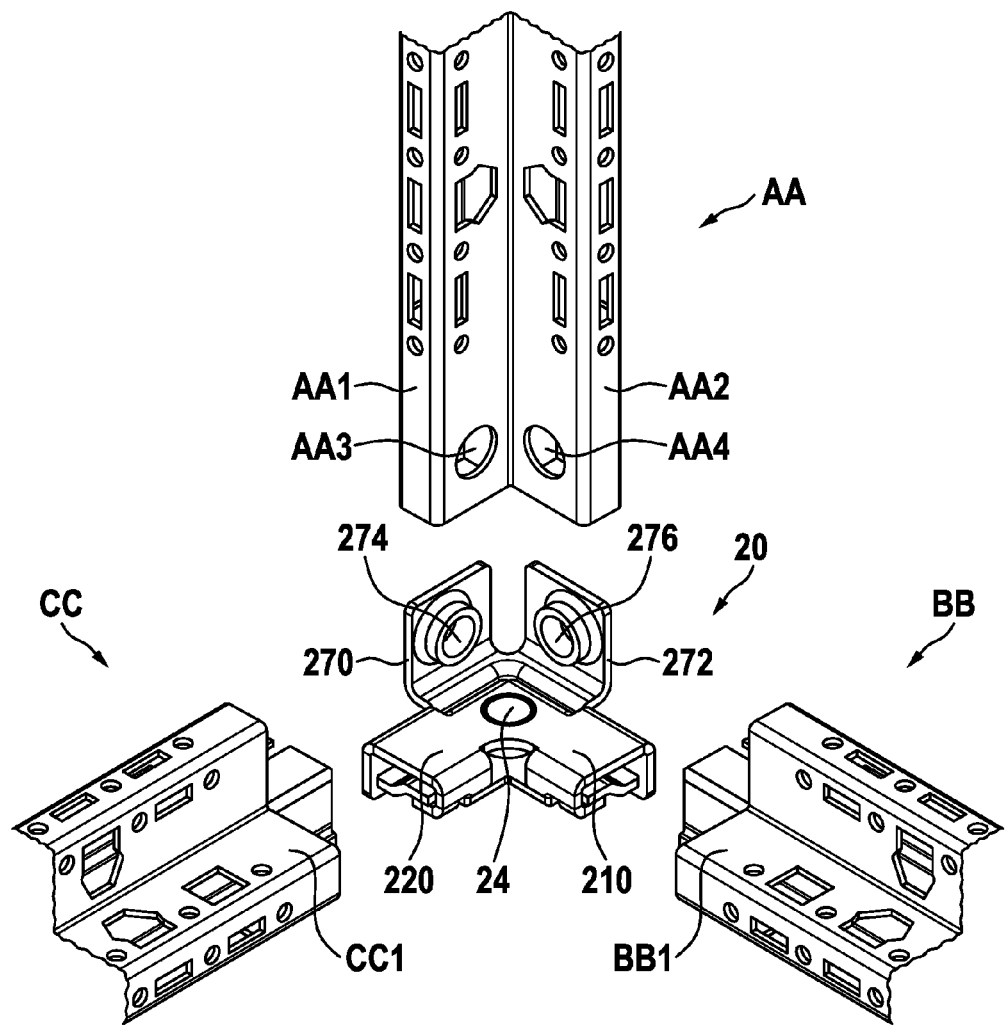
Figure 4:
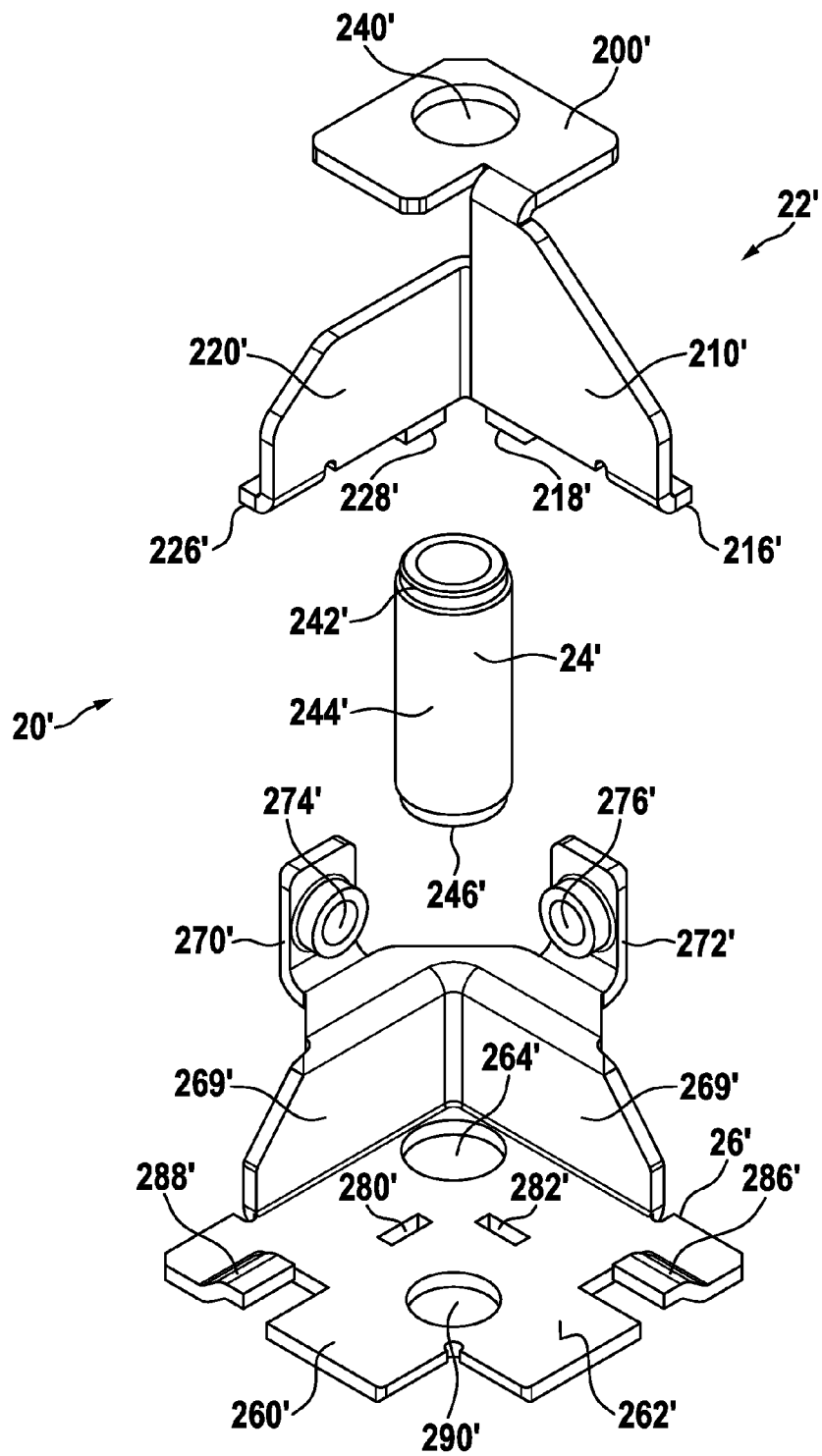
Figure 5:
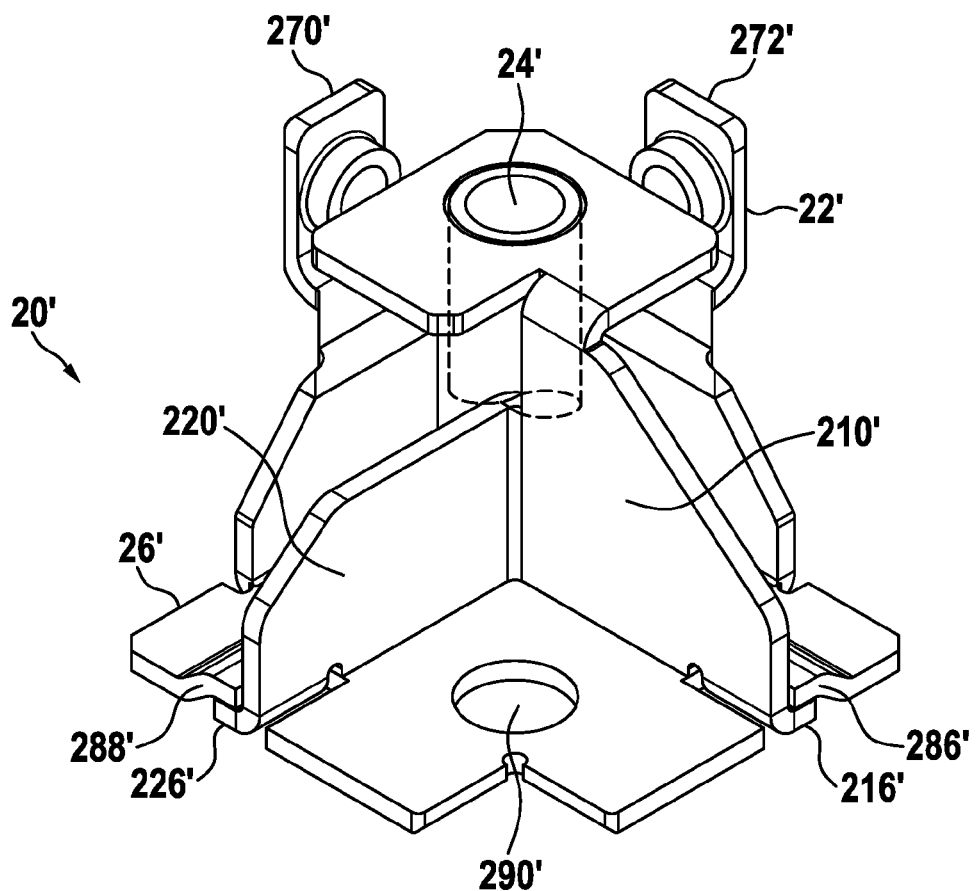

In what follows, the disclosure shall be explained more closely with the aid of the enclosed drawing. The representations in the figures are not necessarily true to scale. There are shown:

FIG. 1, a corner connector according to the present disclosure in an exploded view;

FIG. 2, the corner connector of FIG. 1, in the assembled state;

FIG. 3, the corner connector of FIG. 2, prepared for the connecting of three frame profiles;

FIG. 4, a modification of the corner connector of FIG. 1-3;

FIG. 5, the corner connector of FIG. 4 in an assembled state;

DETAILED DESCRIPTION

Example embodiments will now be described more fully with reference to the accompanying drawings.

FIG. 1 shows a corner connector 20 according to the present disclosure in an exploded view. The corner connector 20 consists of a first molded sheet metal part 22, a threaded sleeve 24 and a second molded sheet metal part 26. The molded sheet metal part 22 has, starting from a central piece 200, two legs 210, 220 standing at an angle of 90°, whose flat top sides are flush with the central piece 200. The legs 210, 220 are each bent, wherein bent regions 212, 222 of the respective legs 210, 220 pointing away from each other project from the central piece 200 at an angle of around 90°. The bent regions 214, 224 of the legs 210, 220 pointing toward each other likewise project from the central piece 200 at an angle of around 90°, but are then further bent into a lug 216, 226, the respective lug 216, 226 pointing toward the opposite lying bent region 212, 222. Moreover, there is a receiving opening 240 in the central piece 200, into which the threaded sleeve 24 is inserted. The second molded sheet metal part 26 has a central plate 260, whose surface in the assembled state of the corner connector 20 forms a reference surface 262 for the central piece 200 of the first molded sheet metal part 22. A receiving opening 264 is formed in the central plate 260, which corresponds in its dimensions to the receiving opening 240 of the first molded sheet metal part 22 and which is likewise provided to receive the threaded sleeve 24. The threaded sleeve 24 has two opposite centering shoulders 242, 246, which are joined by a middle region 244. The threaded sleeve 24 can therefore engage with the receiving openings 240 and 264 during the assembly process and be press-fitted or welded there. In the assembled state of the corner connector 20, the threaded sleeve 24 is accessible through the receiving opening 240 and the receiving opening 264 and can thus be used for a crane lug or for the base fastening. Two legs 270, 272 arranged on an angled base segment 269 emerge from the central plate 260 of the second molded sheet metal part 26, being designed to engage with a frame profile, especially a vertically disposed frame profile. Each of the legs 270, 272 has a passage 274, 276, especially a threaded passage, in which threaded bolts, screws, or the like can be received for ranging several frame racks in a row or attachment of flat pieces. The central plate 260 furthermore comprises a recess 280, 282 near each of the legs 270, 272, into which tabs (not shown) provided on the first molded sheet metal part 22 are inserted for the exact positioning of the first molded sheet metal part 22 and the second molded sheet metal part 26 relative to each other. Opposite each of the legs 270, 272, raised areas 286, 288 are provided on the central plate, beneath which the lugs 216, 226 of the first molded sheet metal part 22 engage during the assembly process. This ensures the positional accuracy of all parts of the corner connector 20 relative to each other.

FIG. 2 shows a perspective view of the corner connector 20, consisting of the parts per FIG. 1. The first molded sheet metal part 22 is placed on the second molded sheet metal part 26 so that the lugs 216, 226 reach underneath the raised area 286, 288 of the second molded sheet metal part 26. Then the first molded sheet metal part 22 is tilted toward the legs 270, 272 of the second molded sheet metal part 26 until the bends 212, 222 of the first leg 210 and the second leg 220 lie across the edges of the central plate 260 of the second molded sheet metal part adjacent to the legs 270, 272. The first molded sheet metal part 22 and the second molded sheet metal part 26 are thus—with threaded sleeve 24 inserted—positioned accurately with respect to each other.

FIG. 3 shows in a schematic representation how three profiles AA, BB, CC are positioned and joined with the help of a corner connector 20 according to FIGS. 1 and 2. The frame profiles BB and CC have hollow profile segments BB1 and CC1, which are adapted in cross section to the outer contour of the legs 210, 220 of the corner connector 20. By shoving the legs 210, 220 in, the frame profiles BB and CC are then positioned at right angle to each other, while the receiving opening 240 and the threaded sleeve situated therein remain exposed. In the installation situation of FIG. 3, the horizontally situated frame profiles BB and CC are part of a bottom subassembly, so that the threaded sleeve 24 can be used in the receiving opening 240 for the base fastening. The projecting legs 270, 272 of the corner connector 20 are dimensioned so that they correspond to hollow chamber segments AA1 and AA2 of the frame profile AA for bearing against an inner wall of the hollow chamber segments so that in the assembled state they bear against an inner wall, while the passages 274, 276 of the respective legs 270, 272 are flush with openings AA3, AA4 in the hollow chamber segments AA1, AA2. Corresponding openings are located at the side of the hollow chamber segments AA1, AA2, turned away from the observer, so that threads in the passages are accessible both from the inside of the frame rack and from the outside of the frame rack. After the positioning and alignment of the frame profiles AA, BB, and CC, they can be connected to the corner connector 20 by the usual techniques, such as by welding or gluing.

FIG. 4 shows a modification of the variant of the corner connector 20 of FIG. 1, wherein the corner connector 20' shown there in exploded view is adapted to a different profile geometry, especially that of a horizontal frame profile in the bottom area of a frame rack. The corner connector 20' consists of a first molded sheet metal part 22', a threaded sleeve 24' and a second molded sheet metal part 26'. The molded sheet metal part 22' has, starting from a central piece 200', two legs 210', 220' standing at an angle of 90° to the central piece 200', wherein the leg 210' is bent down from a corner region of the central piece 200' and the leg 220' adjoins the leg 210' at an angle of 90°. The edges of the legs 210', 220' pointing away from the central piece 200' are flush. The legs 210', 220' are each bent to form a lug 216', 226' at their lower edge in the region of their free ends and furthermore are provided with a downwardly pointing tab 218', 228' near their junction site. The leg 210' is roughly triangular in top view, the leg 220' roughly rectangular with a sliced off corner region opposite the lug 226'. Other geometries are possible. A spacing remains between the upper edge of the leg 220' and the central piece 200'. Furthermore, a receiving opening 240' is present in the central piece 200', in which the threaded sleeve 24' is inserted. The second molded sheet metal part 26' has a central plate 260' whose surface in the assembled state of the corner connector 20' forms a reference surface 262' for the central piece 200' of the first molded sheet metal part 22'. In the central plate 260' there is formed a receiving opening 264', which corresponds in its dimensions to the receiving opening 240' of the first molded sheet metal part 22' and which is likewise provided to receive the threaded sleeve 24'. The threaded sleeve 24 has two opposite centering shoulders 242', 246', which are joined by a middle region 244'. The middle region 244' has an axial length corresponding to the height of the leg 210'. The threaded sleeve 24' can therefore engage with the receiving openings 240' and 264' during the assembly process and be press-fitted or welded there. In the assembled state of the corner connector 20', the threaded sleeve 24' is accessible through the receiving opening 240' and the receiving opening 264' and can be used for a crane lug or for the base fastening. Two legs 270', 272' arranged on an angled base segment 269' emerge from the central plate 260' of the second molded sheet metal part 26', being designed to engage with a frame profile, especially a vertically disposed frame profile. Each of the legs 270', 272' has a passage 274', 276', especially a threaded passage, in which threaded bolts, screws, or the like can be received for ranging several frame racks in a row or attachment of flat pieces. The central plate 260' furthermore comprises a recess 280', 282' roughly in the middle between the receiving opening 264' and an opening 290' spaced diagonally away from this, into which tabs 218', 228' provided on the first molded sheet metal part 22' are inserted for the exact positioning of the first molded sheet metal part 22' and the second molded sheet metal part 26' relative to each other. Opposite each of the legs 270', 272', raised areas 286', 288' are provided on the central plate, beneath which the lugs 216', 226 of the first molded sheet metal part 22' engage during the assembly process. This ensures the positional accuracy of all parts of the corner connector 20' relative to each other.

FIG. 5 shows a perspective view of the corner connector 20', consisting of the parts per FIG. 4. The first molded sheet metal part 22' is placed on the second molded sheet metal part 26' so that the lugs 216', 226' reach underneath the raised areas 286', 288' of the second molded sheet metal part 26. Then the first molded sheet metal part 22' is tilted toward the legs 270', 272' of the second molded sheet metal part 26' until the tabs 218', 228' sit in the recesses 280', 282' (FIG. 7). The first molded sheet metal part 22' and the second molded sheet metal part 26' are thus with threaded sleeve 24' inserted positioned accurately with respect to each other, and such that the opening 290' remains accessible, namely, in front of the legs 210', 220' of the first molded sheet metal part 22'. Thus, the corner connector 20' opens up additional installation possibilities in the interior region of a frame rack, yet remains unseen from the outside as an interior corner connector.

The features of the disclosure disclosed in the foregoing specification, in the drawings, and in the claims can be significant to the realization of the disclosure both individually and in any given combination.

The invention claimed is:

1. A corner connector for connecting at least two frame profiles of a frame rack which are arranged perpendicular to each other, having a plurality of pieces, at least one of which is designed to bear against one or more of the frame profiles, comprising:
wherein the piece which is designed to bear against one or more of the frame profiles is a first molded sheet metal part with a receiving opening in which or on which a threaded sleeve is situated, wherein the threaded sleeve is press-fitted in the receiving opening or welded in or on the receiving opening, wherein the first molded sheet metal part has at least two legs emerging from a central piece, the two legs being perpendicular to each other, for engaging with the respective frame profile and for bearing against at least one inner wall of a respective frame profile, wherein the receiving opening is formed in the central piece, and wherein a second molded sheet metal part is provided, which has a reference surface for the central piece of the first molded sheet metal part, and
wherein the reference surface has another receiving opening having dimensions which correspond to the receiving opening of the first molded sheet metal part, and the threaded sleeve being press-fitted in the other receiving opening of the reference surface or welded on or in the other receiving opening.

2. The corner connector according to claim 1, wherein at least one leg emerges from the reference surface for engagement with a third frame profile.

3. The corner connector according to claim 2, wherein the at least one leg has a passage.

4. The corner connector according to claim 1, wherein the legs of the first molded sheet metal part are bent.

5. The corner connector according to claim 1, wherein the legs or bent regions of the legs have lugs and the reference surface is formed on a central plate, which is contoured so that the reference surface lies against the lugs of the first molded sheet metal part.

6. The corner connector according to claim 1, wherein the central plate has an opening which remains accessible when the frame profiles are placed on the corner connector.

7. A corner connector for connecting at least two frame profiles of a frame rack which are arranged perpendicular to each other, comprising:
a first metal part having;
two legs extending perpendicular to each other from a central portion, the legs each being configured to bear against a frame profile;
the central portion having a circular opening therein;
a threaded sleeve having a top and a bottom;
a second metal part having:
a central portion;
the central portion of the second metal part having a circular opening therein lying below the central opening in the first metal part, and
the bottom of the threaded sleeve being attached to the opening in the central portion of the second metal part and the top of the threaded sleeve being attached to the opening in the central portion of the first metal part, the sleeve remaining accessible when the frame profiles are placed on the corner connector.

8. The corner connector of claim 7 wherein edges of the legs of the first metal part are bent around edges of the second metal part to hold the first metal part and second metal part together.

* * * * *